US008102580B2

(12) United States Patent
Duncan

(10) Patent No.: US 8,102,580 B2
(45) Date of Patent: Jan. 24, 2012

(54) SCANNING ILLUMINATION SYSTEM AND METHOD

(76) Inventor: Wayne O. Duncan, Nashville, TN (US)

( * ) Notice: Subject to any disclaimer, the term of this patent is extended or adjusted under 35 U.S.C. 154(b) by 1097 days.

(21) Appl. No.: 11/700,206

(22) Filed: Jan. 30, 2007

(65) Prior Publication Data
US 2007/0177250 A1 Aug. 2, 2007

Related U.S. Application Data

(60) Provisional application No. 60/763,245, filed on Jan. 30, 2006.

(51) Int. Cl.
G02B 26/08 (2006.01)
(52) U.S. Cl. ............... 359/196.1; 359/201.1; 359/201.2; 359/223.1; 359/224.1
(58) Field of Classification Search .... 359/198.1–200.8, 359/213.1–215.1, 223.1–224.2; 362/268, 362/299, 326–329, 335
See application file for complete search history.

(56) References Cited

U.S. PATENT DOCUMENTS

| RE22,096 E | 5/1942 | Monroe |
| 3,865,790 A | 2/1975 | Du Shane |
| 4,363,085 A | 12/1982 | Demas |
| 4,553,193 A | 11/1985 | Evans |
| 4,797,796 A | 1/1989 | Eastman, II et al. |
| 5,536,975 A | 7/1996 | Jennings |
| 5,816,689 A | 10/1998 | Strazzabosco |
| 6,352,357 B1 | 3/2002 | Woolard |
| 6,832,724 B2 * | 12/2004 | Yavid et al. ............ 235/454 |
| 6,883,947 B1 | 4/2005 | Sarabia |
| 7,149,020 B2 | 12/2006 | Finkelstein |

* cited by examiner

Primary Examiner — James Phan
(74) Attorney, Agent, or Firm — J. Charles Dougherty

(57) ABSTRACT

A method and apparatus for the multi-dimensional control of a light source's brightest point over a targeted area is disclosed. Control and drive electronics are presented to the beam-steering device causing the beam-steering component to steer the spot of light toward a targeted area in at least a two-dimensional scanning pattern about a vertical and horizontal axis. The result is an illuminated pattern displayed on a targeted area that appears to be a solid, uniformly illuminated light pattern, having the intensity of a spot beam and the area of a broad beam.

14 Claims, 16 Drawing Sheets

SCANNING ILLUMINATION SYSTEM AND METHOD

CROSS-REFERENCE TO RELATED APPLICATIONS

This application claims priority from U.S. Provisional Patent App. No. 60/763,245, entitled "Square Beam Light Delivery System" and filed on Jan. 30, 2006, the entire disclosure of which is incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates to illumination systems, and in particular to illumination systems wherein a light source is scanned across a targeted area at a rapid speed such that the entire illuminated pattern appears to be simultaneously illuminated by the light source.

2. Brief Description of the Related Art

Using conventional portable and fixed illumination devices, such as a flashlight or an automobile headlamp, respectively, the light that is cast onto a target is brightest in the center, and loses intensity as it reaches the outside of the light pattern generated by the light source. Such illumination devices usually employ parabolic reflectors to direct the light from the bulb to the targeted area to be illuminated. When the bulb is located at the focus of the parabolic reflector, the light rays leaving the bulb and impacting on the surface of the reflector will travel the same distance as they emerge parallel to the axis. This arrangement results in a bright and concentrated circular-shaped beam, with areas of lower illumination at the periphery of the beam. Such illumination devices must be physically re-positioned toward a particular section of the targeted area in order to strike such section with the brightest point of the light source.

In order to form a broader beam with typical illumination devices, the light bulb is moved within the parabolic reflector so that the bulb is no longer at the focus. The light rays leaving the bulb now reflect off of the parabolic surface and emerge diverging from the axis. The circular-shaped broader beam formed in this manner is less bright by at least the increase in the beam area over the spot, and it will have a non-illuminated spot at the center of the broad beam. This resultant broad beam creates a non-ideal illumination pattern on objects that are to be illuminated. In many conventional flashlights, the user may manually adjust between the tight, circular beam and a broader beam as described herein by applying a twisting motion at the flashlight head, thereby re-positioning the bulb with respect to the reflector.

Some prior attempts to create a broad beam and eliminate the non-illuminated portions of a flashlight's beam of light have included flashlights constructed with complex reflectors including multiple parabola; flashlights constructed with multiple light sources and control circuitry; and flashlights constructed with a light source that moves within the reflector. Examples of flashlights that employ some of the above techniques are described in U.S. Pat. Nos. 4,984,140 and 5,367,446 to Ellion. These patents teach a rapidly changing combination of a broad beam and a spot beam by moving either the light source in relation to a parabolic reflector, or moving the parabolic reflector in relation to the light source, to illuminate over the usually non-illuminated area. The undue complexity of these designs leads to unacceptably high manufacturing costs and to issues of reliability associated with their operation.

Other attempts to produce wide-area illumination devices have employed motors and galvanometers to physically move the parabolic reflector or light source. U.S. Pat. No. 3,865,790 to Du Shane teaches a lighting mechanism that spins horizontally in a 360 degree angle. U.S. Pat. No. 4,797,796 to Eastman, II, et al. teaches a device that oscillates or shakes the parabolic reflector, causing the beam of light to scan a horizontal area. The physical wear on the components, motors, and gears, and the power supply necessary to power the motors and galvanometers, render such designs unpractical for most extended-use purposes.

In addition to prior art that manipulates the parabolic reflector and light source by the use of motors, other attempts have been to manipulate the light beam only. One method to scan a beam is well known as used in supermarket scanners. A rotating hexagon with mirrored surfaces causes the light to be scanned across a targeted area in a one-dimensional pattern. One patent that teaches a system based on this process is U.S. Pat. No. 5,954,416 to Peterson. While casting a broad beam, the hexagon in such devices rotates, and the changing light pattern minimizes a dark area of the beam from the flashlight as the changing pattern directs light rays across the dark area. This one-dimensional spinning scanner can only minimize the typically non-illuminated area, while still only generating a weaker broad beam, and produces the standard problems with physically whirling, motorized mechanisms.

Another attempt at scanning a light source's beam is illustrated in U.S. Pat. No. 4,363,085 to Demas, which provides a vehicle headlamp wherein one or more reflectors scan a collimated beam of light to generate a desired light beam pattern and project it onto the road. In one method, the scanning reflector is actuated by a pair of coil-motor transducers that are coupled to the scanning reflector by ball-and-socket connectors. These actuators move the scanning reflector in two dimensions. A second embodiment uses galvanometric oscillating motors to scan a collimated beam of light in two dimensions and project it onto the road. A pulley system may be tied to the housing of the vehicle headlight to change the overall angle of the device. This design is not intended for portable use, is encumbered by the usual downfalls of spinning and mechanical motors, and requires a non-economical and impractical power supply.

A relatively new device for controlling light beams is available in the form of the digital micro-mirror array. These devices are variously classified as micro-electro-mechanical systems (MEMS) and micro-opto-electro-mechanical systems (MOEMS). Innovations in movie projection systems, such as with the Texas Instruments DLP micro-mirror array device, are now well known in the industry. Color projection display systems utilizing such devices as the DLP system have very high resolution and millions of gray-scale levels, so they can display fine nuances of comparative shades. Many other companies are competing with Texas Instruments with their own designs of reflective arrays. These systems in general are designed to accept the data from an image processor and to use that data to control the on/off stages of the millions of mirrors in their array, to reflect only the desired amount of light for each pixel of the picture image presented by the digital video signal. Simply speaking, this is accomplished by turning the individual mirror for a specific pixel on and off very rapidly. When a mirror is switched on more often than off, a light gray pixel is reflected. When a mirror is switched off more often than on, a dark gray pixel is reflected. Rapid switching allows up to 1024 shades of gray reflections in commercially available devices. In this fashion, the digital video signal entering the system gets converted into a highly detailed grayscale image. Elements of the grayscale image are then fed through a color wheel or some similar mechanism to add color to the gray-scale projection. These devices are usually very expensive, rarely portable, and are designed to reflect a large spot-beam of light back onto a screen, blocking or partially blocking chosen pixel-size elements to project black and gray-scale spots in those chosen pixel areas. Such devices are not beam-steering systems, as known in the industry, but are devices that offer on/off tilt-control of individually addressable micro-mirrors in a large array. Such systems or devices, when all of their arrayed mirrors are aligned in an on or off position, are similar to a solid mirror or a solid non-reflective surface having an overall area of their combined mirrors. In the case where all of the millions of mirrors are reflecting the light source onto a screen, it is analogous to bypassing their system entirely and shining the original light source onto the screen, or reflecting the light source onto the screen using a simple one-piece mirror. In either case, the intensity of the light would not be suitable for an illumination device and the cost of the accompanying electronics would be prohibitive for most illumination applications.

Another example of an application of a beam-steering device is well known in laser projection systems such as in an observatory, where shaded and translucent drawings are projected for such purposes as "laser light shows." Most often, two single mirrors are controlled by separate galvanometers. Such systems are usually a fixed system, having many large components, requiring high voltage, AC power, and computer control. Some systems exist that use a two-dimensional micro-mirror device to eliminate the use of the galvanometer motors, but these systems are generally considered fixed systems designed to project line drawings, and are not usable for general illumination applications.

The limitations of the prior art are overcome by the present invention as described below.

BRIEF SUMMARY OF THE INVENTION

A scanning illumination system according to the present invention utilizes appropriate light sources, beam-shaping optics, specific control and drive electronics, and fast, low-voltage scanning and beam-steering components that steer the focused beam of a light source over an X-Y plane onto a target area in a polygonal-shaped illumination pattern. The beam-steering system components require no motors and the overall system is lightweight and portable. Control of the speed of the scan along the X and Y axes, size and shape of the beam-steering component of the beam-steering device, size of the spot-beam before and after the beam-shaping optics, horizontal line density, and means to satisfy human perception factors are addressed herein.

One advantage of the present system is the projection of an illumination pattern that appears to have the intensity of a spot beam shown over a broad area. Another advantage of the present invention is apparent when comparing the area that is illuminated by a circle of light, such as displayed by existing illumination systems such as but not limited to a flashlight, compared with the polygonal illumination pattern of the current invention. When comparing a circular light pattern having a diameter of eight (8) inches and a subsequent area of 50.24 square inches, using the formula pi (3.14) times the radius squared, to a simple polygon, the square, having a width of eight (8) inches and a subsequent area of 64 square inches, the square-shaped illuminated area covers an additional 13.76 square inches, or 27% more area-coverage. It is easily understood that if a rectangular-shaped illumination pattern with the narrow rectangular dimension of 8 inches were being illustrated, the comparative area-coverage would be greatly increased.

Additionally, the polygonal illumination pattern of the current invention appears more uniform than existing circular illumination patterns that are bright in the center with their brightness diminishing as the beam reaches the edges of the circular light pattern, and the current invention is capable of displaying a broad-area beam presenting no non-illuminated center area. The perceived brightness is greater than actual brightness as a result of the controlled frequency scan of the spot of light. The Broca-Suizer effect that describes the apparent transient increase in brightness of a flash of short duration, details of the relationship between perceived or apparent brightness and actual brightness, the Critical Fusion Frequency, and other related characteristics of human vision are discussed in detail in U.S. Pat. No. 4,984,140 to Ellion and similarly in U.S. Pat. No. 5,954,416 to Peterson, both of which are incorporated herein by reference.

These and other features, objects and advantages of the present invention will become better understood from a consideration of the following description of the preferred embodiments and appended claims in conjunction with the drawings as described following:

DETAILED DESCRIPTION OF THE PREFERRED EMBODIMENT(S)

Figure 1:
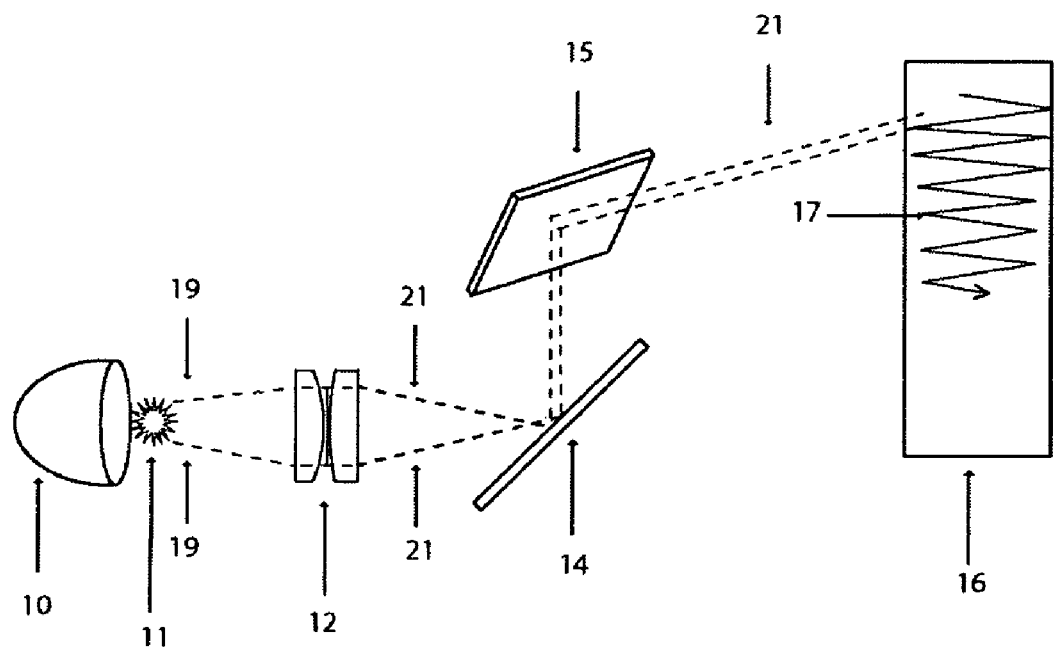
FIG. 1 is a schematic representation of the major components of one preferred embodiment of the present invention utilizing a two-dimensional beam-steering system and an incoherent light source.

A preferred embodiment of the current invention, depicted in FIG. 1, utilizes one element of beam-shaping optics 10 as it collects and reflects the light from light source 11 through beams 19 into another stage of the beam shaping optics, plano-convex lenses 12. The resulting beams 21 leave the beam-shaping optics and arrive at fold back mirror 14. The light is thereby directed by fold back mirror 14 onto beam-steering device 15, a two-dimensional micro-mirror in the preferred embodiment. Beam-steering device 15 scans light beam 21 in a horizontal and vertical pattern toward targeted area 16, resulting in an apparent solid illumination pattern 17 of a polygonal shape.

A related alternative embodiment of the current invention, not shown, includes a collimating lens, as known in the art, between plano-convex lenses 12 and fold back mirror 14 for further beam shaping. In another alternative embodiment of the current invention, fold back mirror 14, added to conserve space in the preferred embodiment, is omitted.

Again in the preferred embodiment depicted in FIG. 1, light source 11 may preferably be an LED, such as is commercially available from Luxeon, model LXHL-NWE8-4. This unit is available with its own collimating optics, providing a beam dispersion of ten degrees and an output of 45 lumens. Luxeon also offers a LED driver, such as the LD Mpuck 2009A. Power is provided to the driver by batteries, not shown, as are well known in the art. Plano-convex lenses 12 may preferably be the type as commercially available from Edmunds Scientific, stock #T-32-954, having a 9 mm focal length. The first piano-lens of plano-convex lenses 12 may preferably be positioned approximately 8.34 mm from the light source and the second plano-lens of plano-convex lens 12 may preferably be positioned approximately 8.34 mm from beam-steering device 15. The overall distance from light source 11 to beam-steering device 15 is preferably approximately 19 mm, including piano-convex lenses 12. Alternatively, film, plastic or other common lenses, micro-lenses, or diffractive optical elements, all well known in the art, that provide an equivalent function may be substituted for or used in combination with piano-convex lenses 12.

The type of micro-mirror used for beam-steering device 15 in this preferred embodiment may be the type commercially available from Hiperscan in Germany, model CST2D, which, having a mirror diameter of 1 mm, operates in a mechanical resonant mode for both the X and Y axes, resulting in X-Y raster-scanning. This model is capable of a fast-axis frequency of 19 kHz and a slow-axis frequency of 600 Hz at a maximum voltage of 70 volts for the fast-axis and 35 volts for the slow-axis. Power can be supplied by batteries, operatively connected through a high voltage converter, not shown but as well known in the art. The Hiperscan module provides its own microcontroller. Alternatively, a point-to-point micro-mirror scanner, such as the type commercially available from Mirrorcletech, might be used in a vector-scanning mode as beam-steering device 15 in order to draw a specifically designed illumination pattern onto the targeted area. In a related alternative embodiment of the present invention, not shown, a shutter is positioned between beam steering device 15 and targeted area 16 causing specified portions of scanned beam 21 to be "blocked out," allowing the shape of illumination pattern 17 to be selectable. The shutter may be an optical shutter as known in the art. Alternatively, the shutter may be of a physical nature. In another alternative embodiment of the present invention, not shown, a separate microcontroller is provided. Such microcontrollers are well known in the art. In still another alternative embodiment of the present invention, not shown, optoelectronics, as known in the art, are added as beam shaping optics between beam steering device 15 and targeted area 16. In still another alternative embodiment of the present invention, not shown, a heat-dissipating material is positioned in the light beam so as to dissipate heat from the light source. In still another alternative embodiment of the present invention, not shown, one or more optical fibers are used in the beam shaping optics between light source 11 and plano-convex lens 12. In still another alternative embodiment of the present invention, not shown, one or more light pipes are used in the beam shaping optics between light source 11 and fold back mirror 14.

Figure 2A:
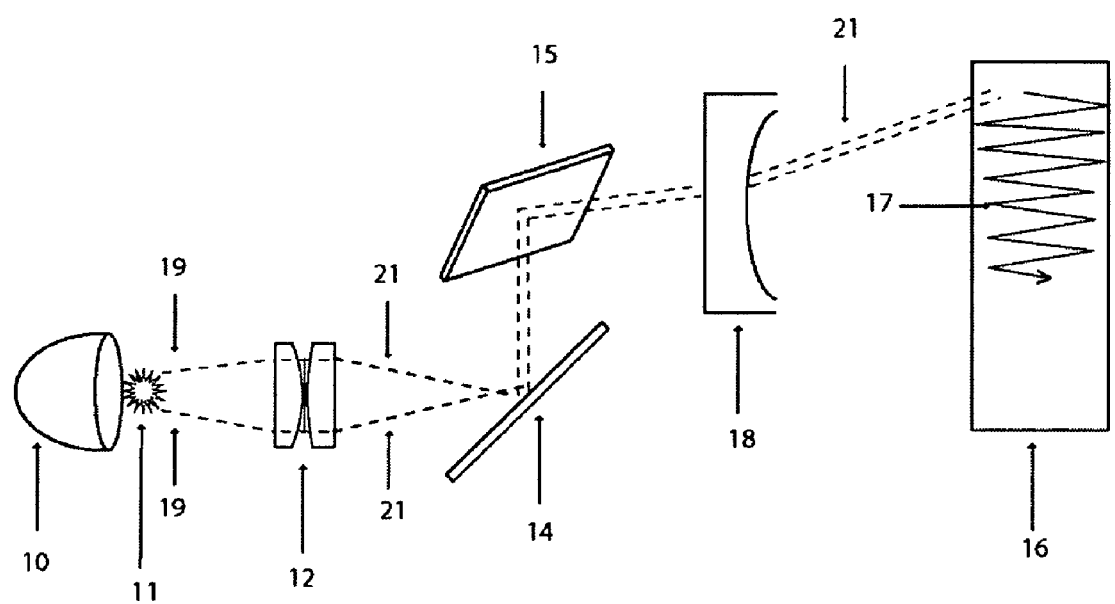
FIG. 2A is another schematic representation of the major components of FIG. 1 with additional beam-shaping optics between the exit of the beam-steering device and the targeted area for further shaping of the beam.
Figure 2B:
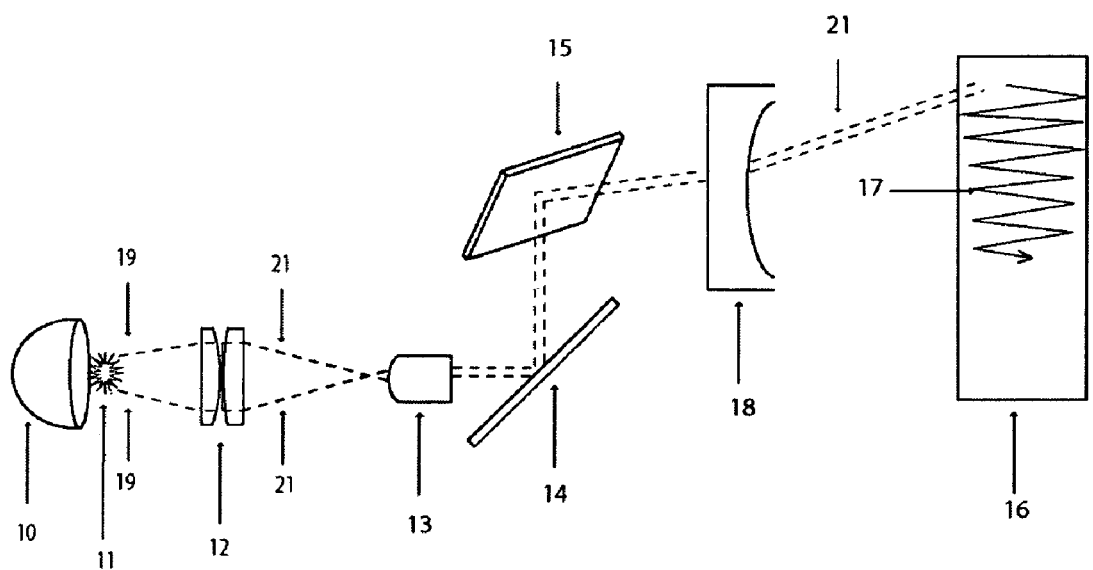
FIG. 2B is a schematic representation of the major components of another preferred embodiment of the present invention wherein additional beam shaping optics in the form of a collimator are added between the beam shaping optics and the fold back mirror.

Referring now to FIG. 2A, another preferred embodiment of the current invention is described. Additional beam shaping optics 18 further shapes beam 21 after leaving beam-steering device 15 in the embodiment illustrated in FIG. 1. Beam shaping optics 18 may be a type such as diffractive optical elements, as well known in the art. The diffractive optical elements used in this invention may be of the phase-encoding or amplitude-encoding or mixed types. They may be fixed, manually adjustable, or computer controllable, all types well known in the art. Alternatively, beam shaping optics 18 may be a common lens as known in the art. In FIG. 2B, an alternative preferred embodiment is shown in which additional beam shaping optics in the form of collimator 13 is added between piano-lenses 12 and fold back mirror 14 in the embodiment illustrated in FIG. 2. In still another alternative embodiment of the present invention, not shown, one or more optical fibers are used in the beam shaping optics between light source 11 and plano-convex lens 12 in the embodiment illustrated in FIGS. 1 and 2.

Figure 3:
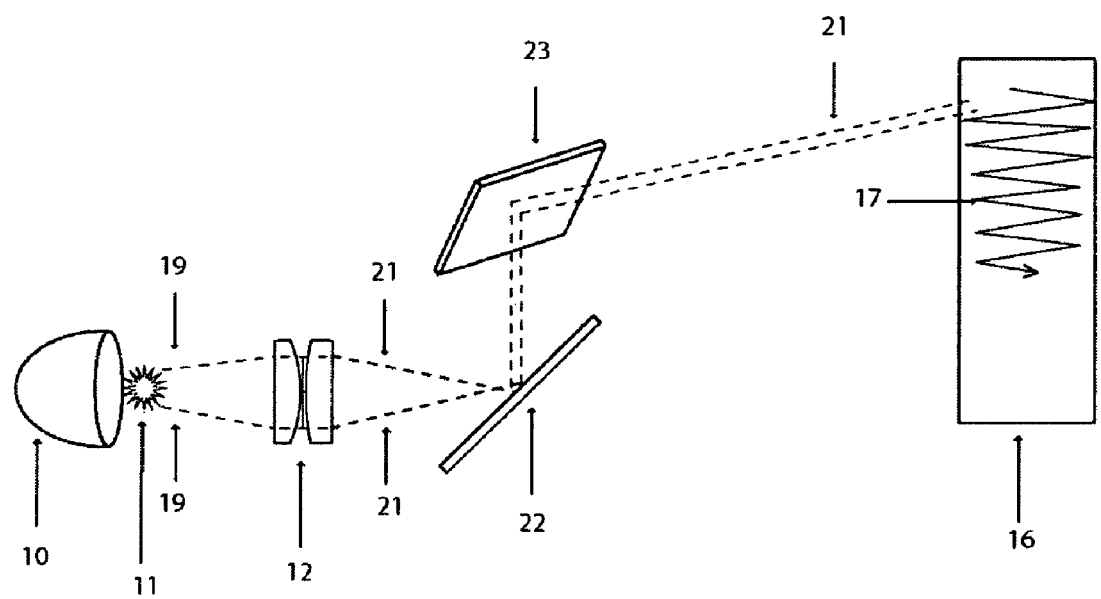
FIG. 3 is a schematic representation of the major components of another preferred embodiment of the present invention wherein the beam-steering system comprises two one-dimensional beam-steering devices wherein the light source is an incoherent light source.

Referring now to FIG. 3, another preferred embodiment of the present invention is described. The beam-steering system here comprises two one-dimensional beam-steering devices, 22 and 23, one of which provides the horizontal scan and the other providing the vertical scan, in a configuration with incoherent light source 11. Single micro-mirrors as the type commercially available from many manufacturers, such as Hiperscan, may be used in this embodiment. One element of beam-shaping optics 10 collects and reflects the light from light source 11 through beams 19 into another stage of the beam shaping optics, plano-convex lenses 12. The resulting beams 21 leave the beam-shaping optics and arrive at fold back mirror 14. The light is thereby directed by fold back mirror 14 onto the first beam-steering device 22, which scans the light in a horizontal or vertical pattern onto the second beam-steering device 23. Beam-steering device 23 scans light beam 21 in a horizontal or vertical pattern toward targeted area 16, resulting in an apparent solid illumination pattern 17 of a polygonal shape. In a related alternative embodiment of the present invention, not shown, additional beam shaping optics 18 further shapes beam 21 after leaving beam-steering device 15. In another relative alternative embodiment of the present invention, not shown, multiple incoherent light sources are used in the two one-dimensional beam-steering device configuration. In still another alternative embodiment of the present invention, not shown, a collimator is added between plano-lenses 12 and fold back mirror 14. In still another alternative embodiment of the present invention, not shown, a shutter is positioned between beam steering device 23 and targeted area 16 causing specified portions of scanned beam 21 to be blocked allowing the shape of illumination pattern 17 to be selectable. In another alternative embodiment of the present invention, not shown, a separate microcontroller is provided. Such microcontrollers are well known in the art.

Figure 4:
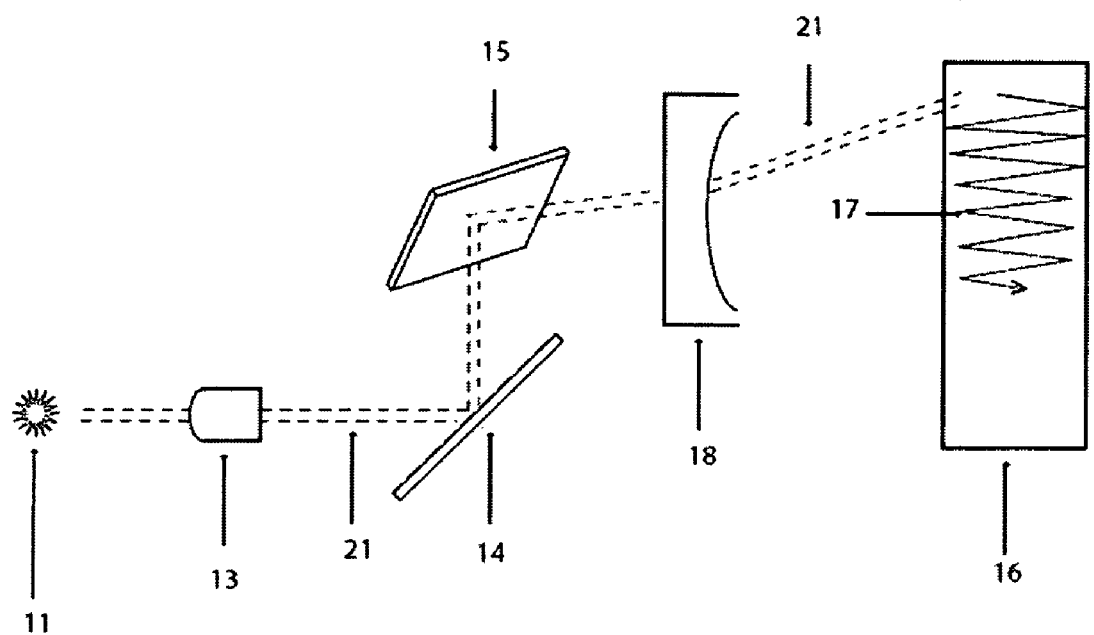
FIG. 4 is a schematic representation of the major components of another preferred embodiment of the present invention utilizing a two-dimensional beam-steering system, beam shaping optics and a coherent light source.

Referring now to FIG. 4, another preferred embodiment of the present invention is described. Coherent light source 11 is directed in rays 21 through beam-shaping optics 13 and toward fold back mirror 14. The light is thereby directed by fold back mirror 14 onto beam-steering device 15, which in this preferred embodiment is a two-dimensional micro-mirror. The micro-mirror scans the light beam in a horizontal and vertical pattern, through beam shaping device 18, toward targeted area 16. The illumination pattern 17 is drawn in a polygonal shape. Beam-shaping optics 13 may be diffractive optical elements, as known in the art. Alternatively beam-shaping optics 13 may be a common lens. A related alternative embodiment of the present invention, not shown, omits the beam shaping optics between light source 11 and fold back mirror 14. In another alternative embodiment of the present invention, fold back mirror 14, added to conserve space in the preferred embodiment, is omitted. In still another alternative embodiment of the present invention, not shown, multiple coherent light sources are used. In still another alternative embodiment of the present invention, not shown, an infrared device is substituted for the coherent light source. In still another alternative embodiment of the present invention, not shown, an ultraviolet device is substituted for the coherent light source. In still another alternative embodiment of the present invention, not shown, a shutter is positioned between the exiting scanned beam 21 and targeted area 16 causing specified portions of the scanned beam to be blocked allowing the shape of the illumination pattern 17 to be selectable. In another alternative embodiment of the present invention, not shown, a separate microcontroller is provided. Such microcontrollers are well known in the art.

Figure 5:
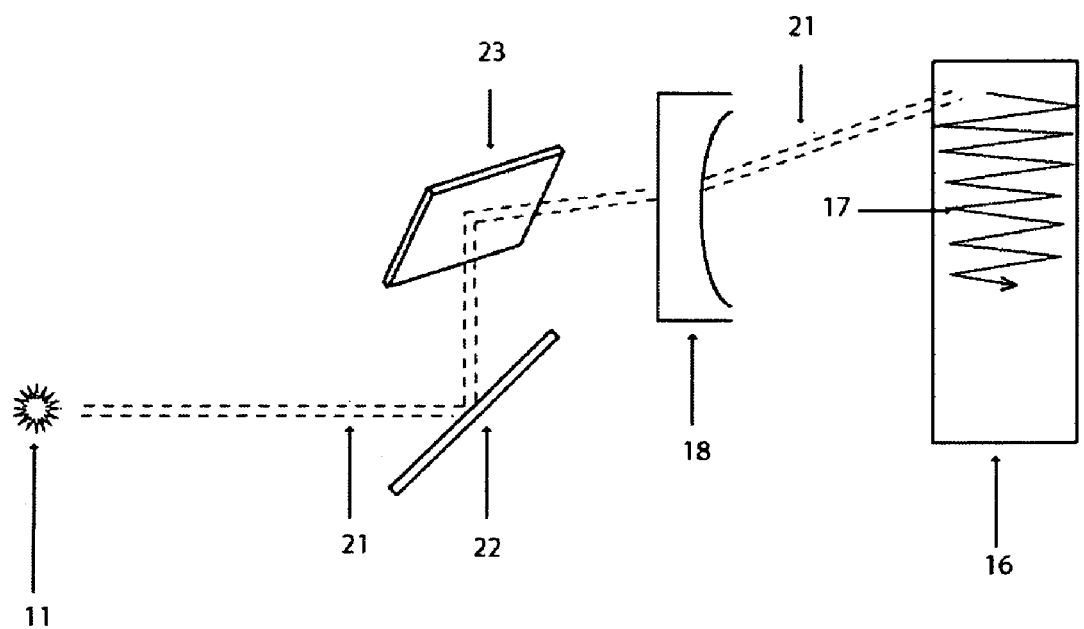
FIG. 5 is a schematic representation of the major components of another preferred embodiment of the present invention wherein the beam-steering system comprises two one-dimensional beam-steering devices and the light source is a coherent light source.

Referring now to FIG. 5, another preferred embodiment of the present invention may be described. In this preferred embodiment, the beam-steering system comprises two one-dimensional beam-steering devices, 22 and 23, one of which provides the horizontal scan and the other providing the vertical scan, in a configuration with coherent light source 11. Light source 11, through beam 21, reflects off of first beam-steering device 22 and onto second beam-steering device 23, which scans the light beam in a horizontal and vertical pattern, through beam shaping device 18, toward targeted area 16 via scanned beam 21. Illumination pattern 17 is drawn in a polygonal shape. A related alternative embodiment of the current invention, not shown, includes a collimating lens between light source 11 and the first micro-mirror 22 for further beam shaping. In another alternative embodiment of the current invention, not shown, multiple coherent light sources are used in the two one-dimensional beam-steering device configuration. In still another alternative embodiment of the present invention, not shown, an infrared device is substituted for the coherent light source. In still another alternative embodiment of the present invention, not shown, an ultraviolet device is substituted for the coherent light source. In still another alternative embodiment of the present invention, not shown, a shutter is positioned between the exiting scanned beam 21 and targeted area 16 causing specified portions of the scanned beam to be blocked allowing the shape of the illumination pattern 17 to be selectable. In another alternative embodiment of the present invention, not shown, a separate microcontroller is provided. Such microcontrollers are well known in the art.

Figure 6:
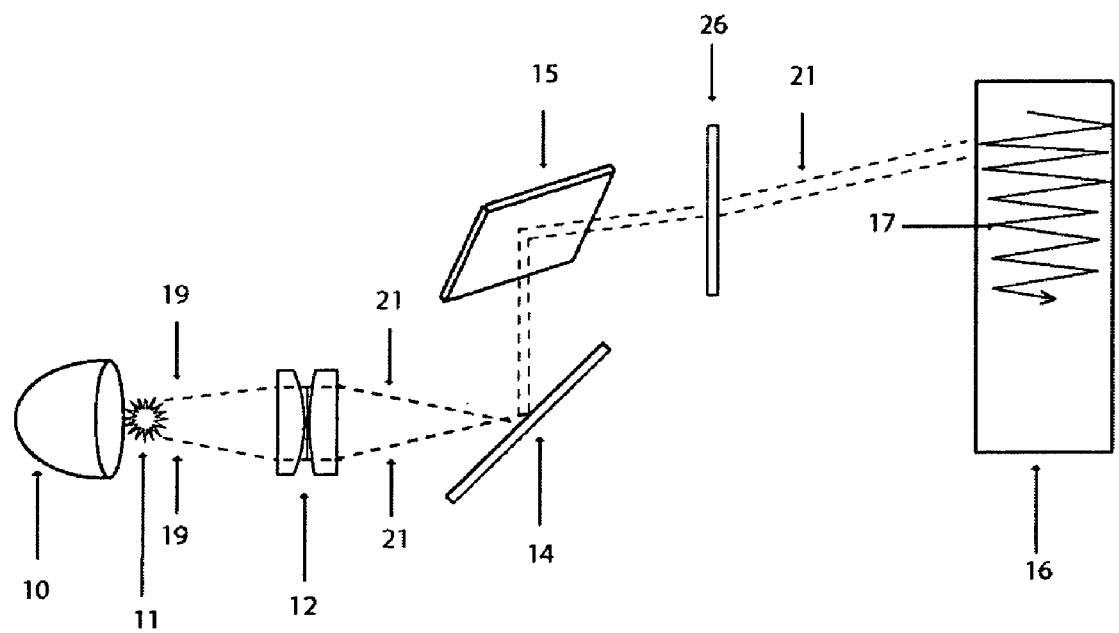
FIG. 6 is a schematic representation of the major components of another preferred embodiment of the present invention wherein the beam-steering system comprises two one-dimensional beam-steering devices wherein one beam-steering device is a reflective device and the other device transmissive, either diffractive or refractive, and the light source being an incoherent light source.

Referring now to FIG. 6, another preferred embodiment of the current invention may be described. In this preferred embodiment, the beam-steering system is two one-dimensional beam-steering devices wherein one beam-steering device is a reflective device and the other device transmissive, either diffractive or refractive, and the light source is an incoherent light source. Beams 19 from light source 11 travel through piano-lenses 12, and arrive at fold back mirror 14 through lines 21. That light is reflected onto the first one-dimensional beam steering device 15, reflecting a horizontal or vertical pattern onto the second one-dimensional beam-steering device 26, a transmissive device that can be either refractive or diffractive. The resulting beam 21 is scanned onto target area 16 in polygonal illumination pattern 17. In a related alternative embodiment of the present invention, not shown, a second beam shaping optics is inserted between plano-lens 12 and fold back mirror 14. Said beam shaping optics may be diffractive optical elements, as known in the art. Alternatively said beam shaping optics may be a common lens. Also, in another alternative embodiment of the present invention, not shown, multiple incoherent light sources are used. The type of transmissive beam-steering device as depicted in number 26 may be a liquid crystal filled diffraction grating, as are well known in the art. Alternatively, it may be a diffractive optical element, also known in the art. In still another alternative embodiment of the present invention, not shown, a shutter is positioned between the exiting scanned beam 21 and targeted area 16 causing specified portions of the scanned beam to be blocked allowing the shape of the illumination pattern 17 to be selectable. In another alternative embodiment of the present invention, not shown, a separate microcontroller is provided. Such microcontrollers are well known in the art. In another alternative embodiment of the present invention, not shown, fold back mirror 14 and one-dimensional beam-steering device 15 are omitted. A two-dimensional transmissive beam steering device, as known in the art, is substituted for the one-dimensional transmissive beam steering device 26 so that light from plano-convex lens 12 is directed through the two-dimensional transmissive beam steering device.

Figure 7:
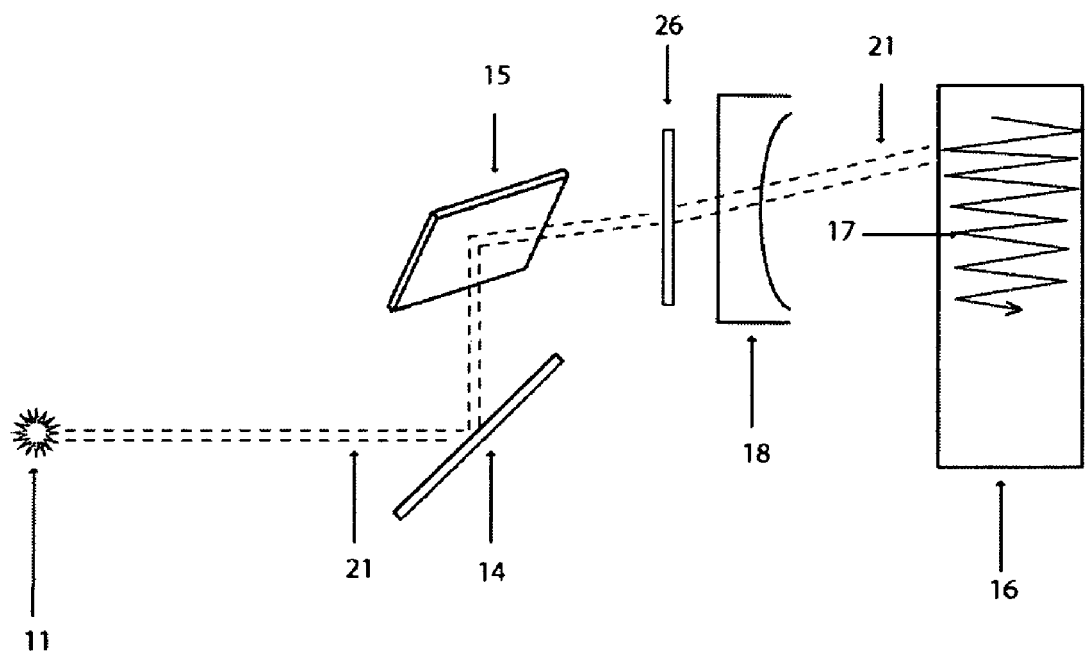
FIG. 7 is a schematic-representation of the major components of another preferred embodiment of the present invention wherein the beam-steering system comprises two one-dimensional beam-steering devices wherein one beam-steering device is a reflective device and the other device transmissive, either diffractive or refractive, and the light source is a coherent light source.

Referring now to FIG. 7, another preferred embodiment of the present invention may be described. In this preferred embodiment, a coherent light source has been substituted for the incoherent light source in the embodiment illustrated in FIG. 6, and beam shaping optics 12 is omitted. Additional beam shaping optics 18 is added between second one-dimensional beam-steering device 26 and targeted area 16. Said beam shaping optics may be diffractive optical elements, as well known in the art. Alternatively, said beam shaping optics may be a common lens. In a related alternative embodiment of the present invention, not shown, a second beam shaping optics is inserted between light source 11 and fold back mirror 14. Said beam shaping optics may be diffractive optical elements, as known in the art. Alternatively, said beam shaping optics may be a common lens. Also, in another alternative embodiment of the present invention, not shown, multiple coherent light sources are used. The type of transmissive beam-steering device as depicted in number 26 may be a liquid crystal filled diffraction grating, as are well known in the art. Alternatively, it may be a diffractive optical element. In still another alternative embodiment of the present invention, not shown, a shutter is positioned between the exiting scanned beam 21 and targeted area 16 causing specified portions of the scanned beam to be blocked allowing the shape of the illumination pattern 17 to be selectable. In another alternative embodiment of the present invention, not shown, a separate microcontroller is provided. Such microcontrollers are well known in the art.

Figure 8:
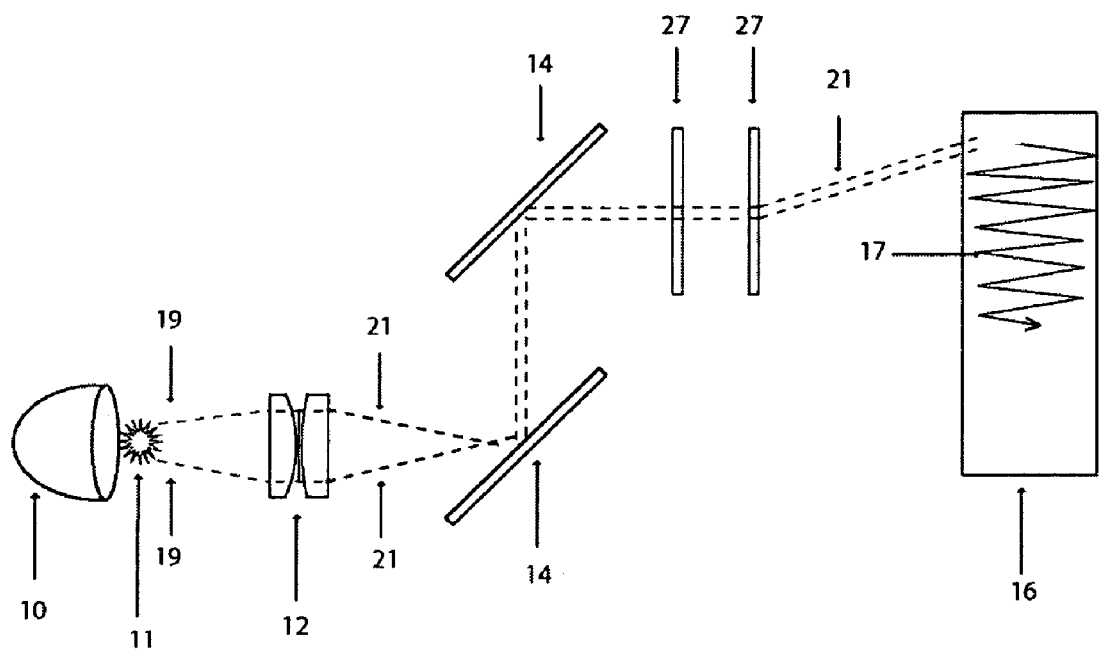
FIG. 8 is a schematic representation of the major components of another preferred embodiment of the present invention wherein the beam-steering system comprises two one-dimensional beam-steering devices wherein both beam-steering devices are transmissive devices and the light source is an incoherent light source.

Referring now to FIG. 8, another preferred embodiment of the present invention may be described. In this embodiment, the beam-steering system comprises two one-dimensional beam-steering devices wherein both beam-steering devices are transmissive devices and the light source is an incoherent light source. The beam-steering system may comprise two refractive devices or two diffractive devices, or one of each. Light from light source 11, after being collected and reflected by one element of beam-shaping optics 10, is directed through beams 19 into another stage of the beam shaping optics, plano-convex lenses 12. The resulting beams 21, after leaving plano-convex lenses 12, are reflected between the two fold back mirrors 14, to reflect into the first beam-steering device 27, a transmissive device, then into the second beam-steering device 27, also a transmissive device. Exiting light 21 is scanned over targeted area 16 in a polygonal pattern 17. In a related alternative embodiment of the present invention, not shown, a collimator is added between plano-lenses 12 and the first fold back mirror 14. In another alternative embodiment of the present invention, not shown, multiple incoherent light sources are used. In still another alternative embodiment of the present invention, not shown, a diffractive optical element is positioned between beam shaping optics 12, and fold back mirror 14. In still another alternative embodiment of the present invention, not shown, a shutter is positioned between the exiting scanned beam 21 and targeted area 16 causing specified portions of the scanned beam to be blocked allowing the shape of the illumination pattern 17 to be selectable. In another alternative embodiment of the present invention, not shown, a separate microcontroller is provided. Such microcontrollers are well known in the art. In still another alternative embodiment of the present invention, not shown, fold back mirrors 14 are omitted.

Figure 9:
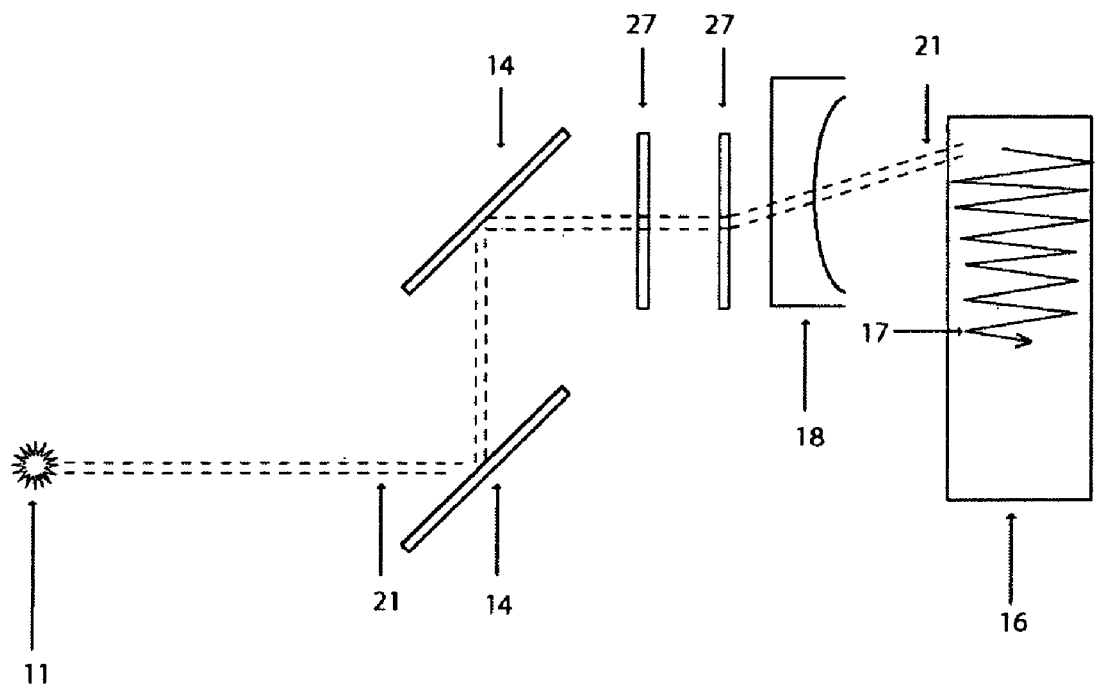
FIG. 9 is a schematic representation of the major components of another preferred embodiment of the present invention wherein the beam-steering system comprises two one-dimensional beam-steering devices wherein both beam-steering devices are transmissive devices and the light source is a coherent light source.

Referring now to FIG. 9, another preferred embodiment of the present invention may be described. In this embodiment, the beam-steering system comprises two one-dimensional beam-steering devices wherein both beam-steering devices are transmissive devices and the light source comprises a coherent light source. The beam-steering system may comprise two refractive devices or two diffractive devices, or one of each. Light from light source 11 is reflected through beams 21 between the two fold back mirrors 14, to reflect into the first beam-steering device 27, a transmissive device, then into the second beam-steering device 27, also a transmissive device. The exiting light 21 is scanned through beam-shaping optics 18, and then over targeted area 16, in polygonal pattern 17. In a related alternative embodiment of the present invention, not shown, a collimator is added between light source 11 and the first fold back mirror 14. In another alternative embodiment of the present invention, not shown, multiple coherent light sources are used. In still another alternative embodiment of the present invention, not shown, a diffractive optical element is positioned between light source 11 and fold back mirror 14. In still another alternative embodiment of the present invention, not shown, beam shaping optics 18 is omitted. In still another alternative embodiment of the current invention, one or both fold back mirrors 14, added to conserve space in the preferred embodiment, is omitted. In still another alternative embodiment of the current invention, fold back mirrors 14 and beam shaping optics are omitted and the light beam 21 is directed into the first beam steering device 27. In still another alternative embodiment of the present invention, not shown, a shutter is positioned between the exiting scanned beam 21 and targeted area 16 causing specified portions of the scanned beam to be blocked allowing the shape of the illumination pattern 17 to be selectable. In another alternative embodiment of the present invention, not shown, a separate microcontroller is provided. Such microcontrollers are well known in the art.

Figure 10A:
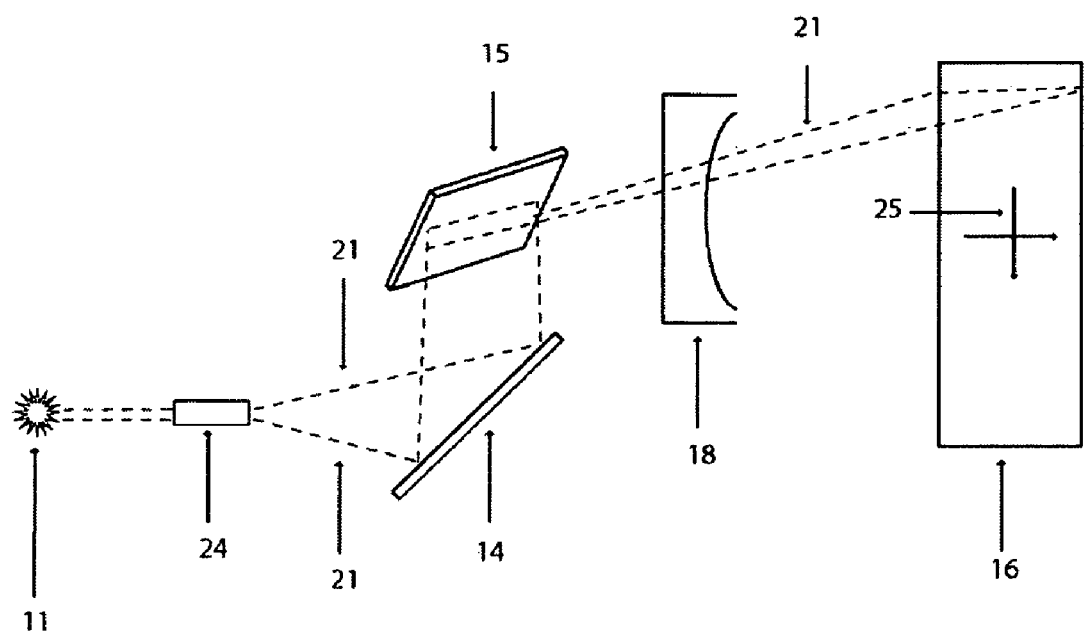
FIGS. 10A and 10B are schematic representations of the major components of another preferred embodiment of the present invention wherein the beam-steering system comprises two one-dimensional beam-steering devices wherein a coherent and incoherent light source is focused through a transmissive device, such as a diffractive optical element, and onto a one-dimensional reflective device.
Figure 10B:
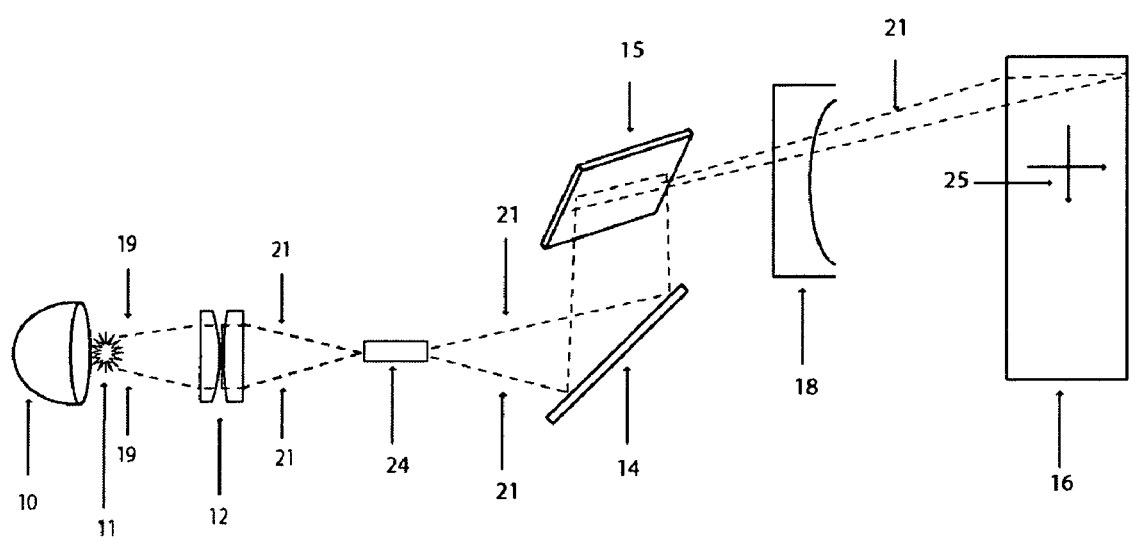

Referring now to FIGS. 10A and 10B, another preferred embodiment of the present invention may be described. In this embodiment, the beam-steering system is a two-dimensional beam-steering device wherein a coherent light source, shown in FIG. 10A, or an incoherent light source, shown in FIG. 10B, is focused through either a diffractive or refractive transmissive device 24 to draw a pattern such as a line or series of spots onto fold back mirror 14. This pattern is received by the beam-steering device 15 and scanned through beam-shaping optics 18, and then over target area 16 in a horizontal or vertical direction, 25 in polygonal shape 17. Transmissive device 24 may be a diffractive optical element, as well known in the art. In a related alternative embodiment of the present invention, not shown, beam-steering device 15, shown in FIGS. 10A and 10B, is a one-dimensional beam-steering device having an array of mirrors. In another alternative embodiment of the present invention, not shown, beam shaping device 18, shown in FIGS. 10A and 10B, is omitted. In still another alternative embodiment of the present invention, not shown, a shutter is positioned between the exiting scanned beam 21 and targeted area 16 shown in FIGS. 10A and 10B, causing specified portions of the scanned beam to be blocked allowing the shape of the illumination pattern 17 to be selectable. In another alternative embodiment of the present invention, not shown, a separate microcontroller is provided to FIGS. 10A and 10B. Such microcontrollers are well known in the art.

Figure 11:
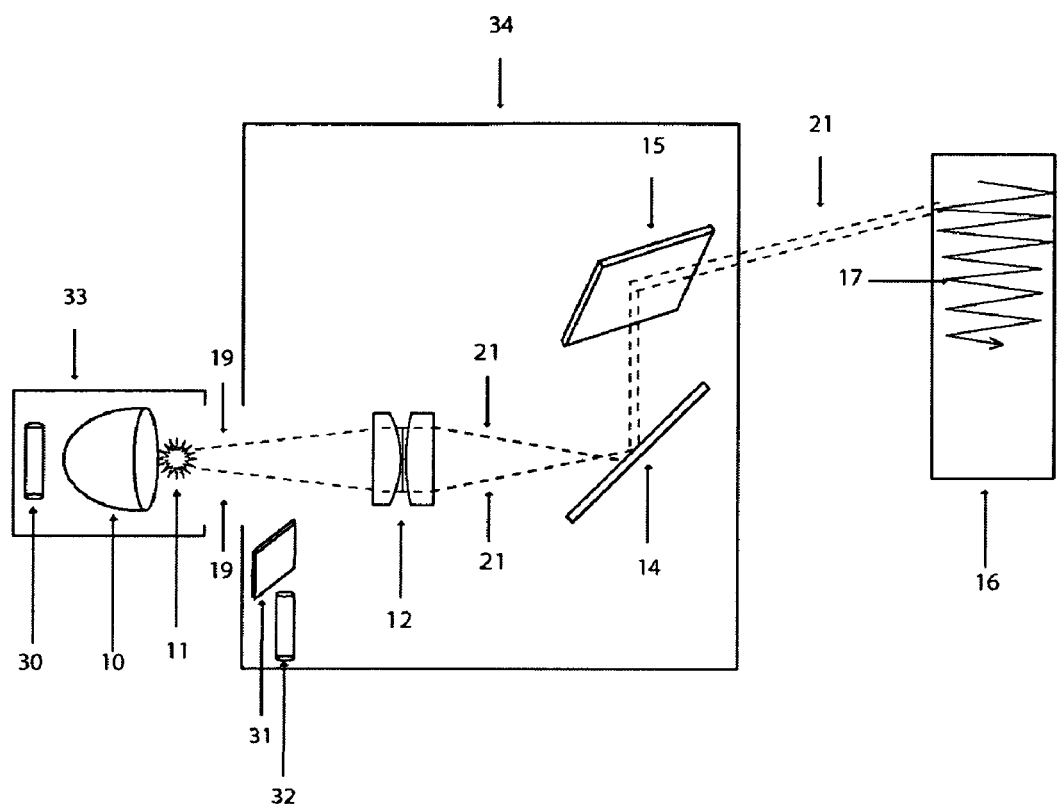
FIG. 11 is a schematic representation of the major components of another preferred embodiment of the present invention utilizing a two-dimensional beam-steering system in a configuration whereby the optical system and beam-steering system are an attachment for use with existing lighting and illumination systems.

Referring now to FIG. 11, another preferred embodiment of the present invention may be described. In this embodiment, the two-dimensional beam-steering system and the optical system are located in attachment 34 for use with existing self-powered lighting and illumination systems 33, such as but not limited to flashlights. Illumination unit 33 includes power source 30 (preferably a battery or batteries as known in the art), beam shaping optics 10, and light source 11. Attachment 34 includes piano-lenses 12, fold back mirror 14, two-dimensional beam-steering device 15, a solar cell and light sensor 31, and a preferably rechargeable power source 32. Attachment 34 is attached to illumination unit 33, so that light source 11 is directed onto plano-lenses 12 of attachment 34. Solar cell and light sensor 31 receives light from light source 11 to sense when the lighting device is activated and to recharge internal power source 32, which is housed in attachment 34 to power the beam-steering system. In this fashion, an ordinary illumination device utilizes the current invention to paint its light source over targeted area 16 in polygonal pattern 17. In a related alternative embodiment of the present invention, not shown, the beam-steering system comprises two one-dimensional beam-steering devices. In another alternative embodiment of the present invention, not shown, a beam shaping optics is positioned between the exiting scanned beam 21 and targeted area 16. In still another alternative embodiment of the present invention, not shown, a shutter is positioned between the exiting scanned beam 21 and targeted area 16 causing specified portions of the scanned beam to be blocked allowing the shape of the illumination pattern 17 to be selectable. In another alternative embodiment of the present invention, not shown, a separate microcontroller is provided. Such microcontrollers are well known in the art. In still another alternative embodiment of the present invention, not shown, plano-convex lens 12 is omitted with the incoming light directed onto fold back mirror 14 or onto beam steering device 15 in the event that fold back mirror 14 is omitted. In still another alternative embodiment of the present invention, not shown, wherein the beam-steering system comprises two one-dimensional beam steering devices, both being transmissive devices, another fold back mirror is added, or both mirrors are omitted.

Figure 12:
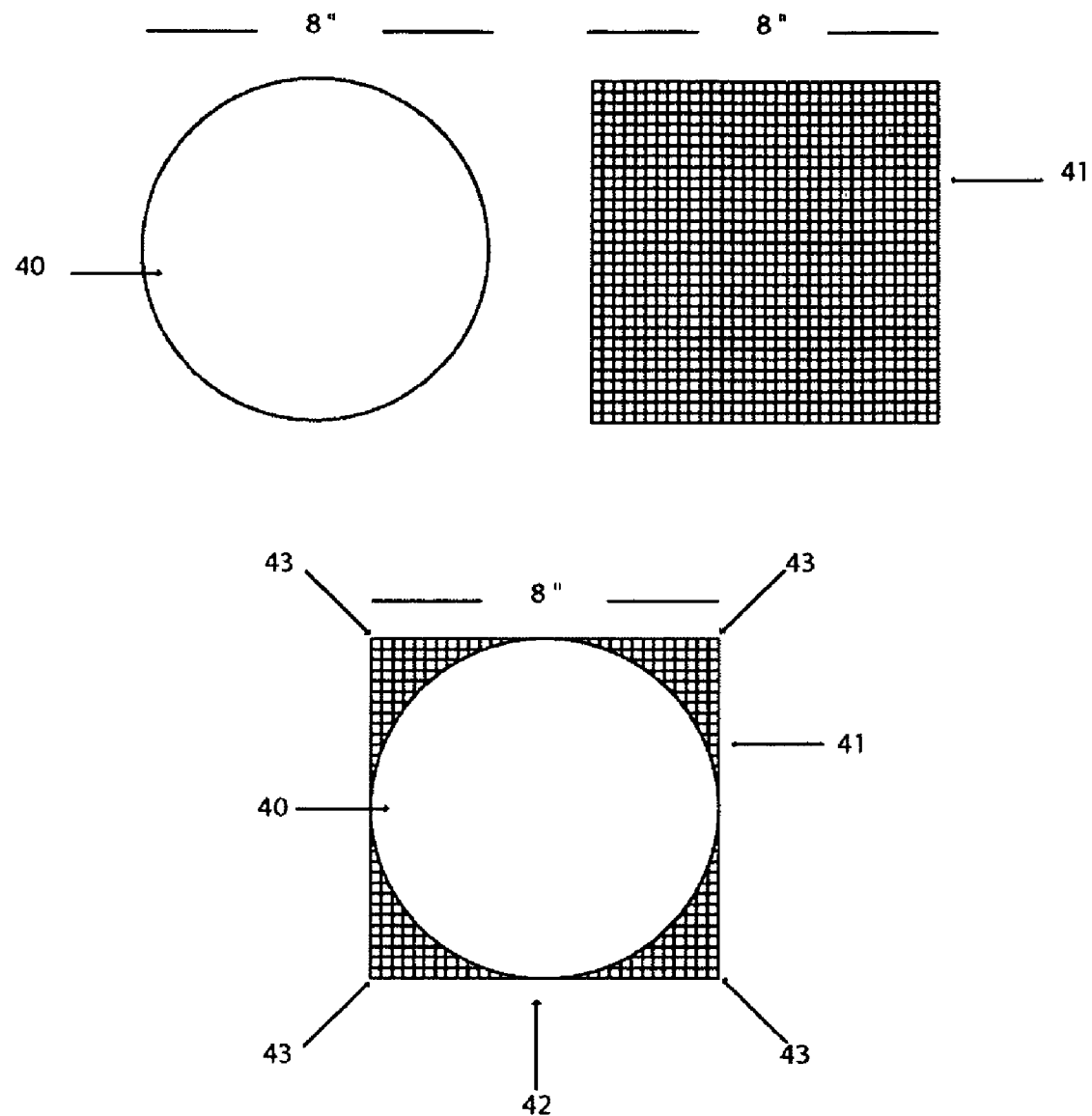
FIG. 12 is a comparative illustration of the illuminated areas covered by a circular and polygonal illumination pattern.

FIG. 12, applicable to each of the embodiments described herein, is a comparative illustration of the illuminated areas covered by a circle verses a polygon, in this case a square. Circular area 40 represents a circle with a diameter of 8 inches. Square area 41 represents a square with a width of 8 inches. Superposition 42 illustrates the superimposition of circular area 40 over square area 41. The cross-hatched portions 43 illustrate the additional light coverage of a polygonal illumination pattern, in this case a square, compared to a circular illumination pattern, as also noted elsewhere herein.

Figure 13:
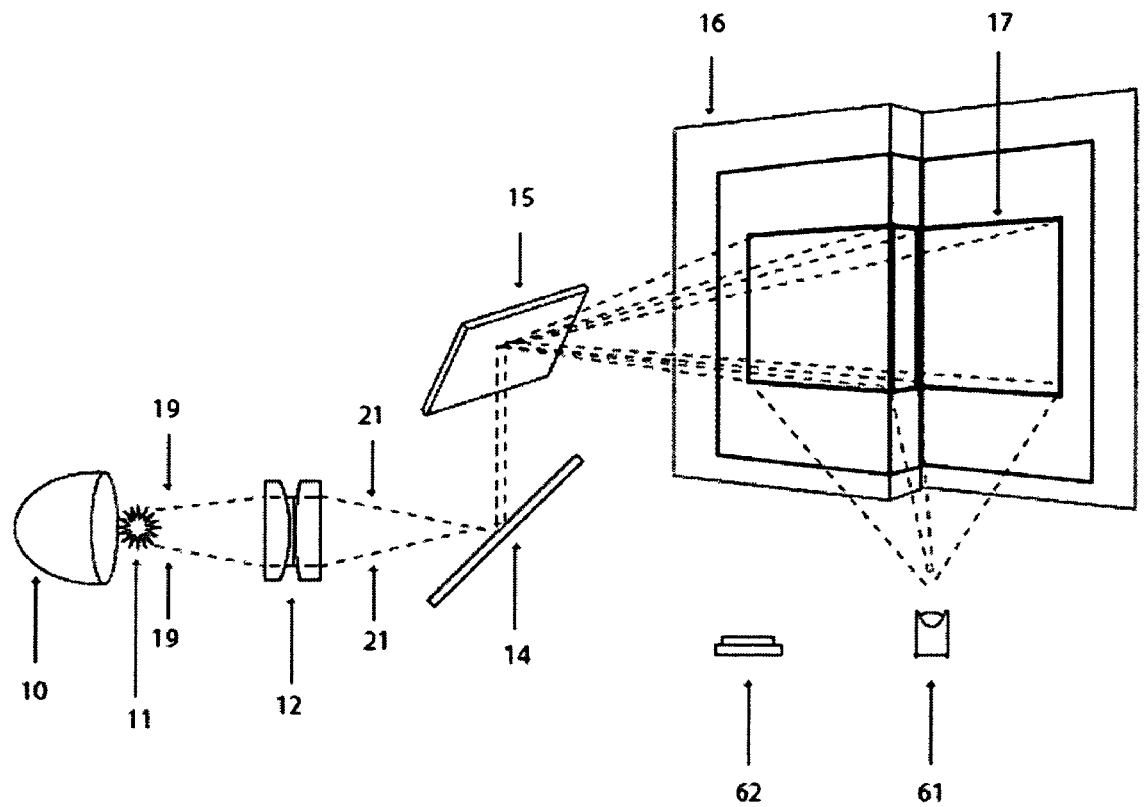
FIG. 13 is a schematic representation of the major components of another preferred embodiment of the present invention utilizing a two-dimensional beam-steering system, an incoherent light source, and a focusing sensor for designating which specific areas within the targeted area are to be illuminated.

Referring now to FIG. 13, another preferred embodiment of the present invention may be described. In this embodiment, one element of beam-shaping optics 10 is shown as it collects and reflects the light from incoherent light source 11 through beams 19 into plano-convex lenses 12. The resulting beams 21 arrive at fold back mirror 14. The light is thereby directed by fold back mirror 14 onto beam-steering device 15, preferably a two-dimensional micro-mirror. Focusing-sensor 61 determines the shape of the area to be illuminated and provides that data to microcontroller 62, connection not shown, which is operatively connected (connection not shown) to light source 11, and beam-steering device 15. Exiting rays 21 scan a pattern that is determined by focusing-sensor 61, illuminating only the specified shape or region 17 of targeted area 16. This may be accomplished by either pulsing the light source or controlling the tilt of the X-Y axis of the beam-steering device or by means of a shutter or a combination thereof. The result is an apparent solid illumination pattern displayed only on the portion of the targeted area as specified by focusing-sensor 61. In a case where focusing-sensor 61 is concerned with distances, the illumination pattern can be present only in the nearest, farthest or selectable points of the targeted area, which may cause the light to not extend beyond the perimeter of the face of a targeted area such as, but not limited to, illuminating the end of a box, and causing light to fall only on the end of the box and not the background of the targeted area. Examples of focusing-sensors are, but are not limited to, such devices as those used in photographic cameras to automatically adjust the camera focus, as known in the art. In a related alternative embodiment of the present invention, not shown, an infrared-sensing device has been substituted for focusing-sensor 61. In a related alternative embodiment of the present invention, not shown, an ultraviolet-sensing device may be substituted for focusing-sensor 61. In another alternative embodiment of the present invention, not shown, an shutter is positioned between the exiting scanned beam 21 and targeted area 16 to assist with only illuminating a designated area. In still another alternative embodiment of the present invention, not shown, a coherent light source is used and beam shaping optics 12 are omitted. In still another alternative embodiment of the present invention, not shown, an infrared device is substituted for the coherent light source. In still another alternative embodiment of the present invention, not shown, an ultraviolet device is substituted for the coherent light source. In still another alternative embodiment of the present invention, not shown, the beam-steering system comprises two one-dimensional beam-steering devices. In still another alternative embodiment of the present invention, not shown, the light source comprises multiple light sources. In still another alternative embodiment of the present invention, not shown, the light source utilizes multiple and dissimilar light sources. In still another alternative embodiment of the present invention, not shown, beam shaping optics 12 is omitted. In still another alternative embodiment of the present invention, not shown, fold back mirror 14 is omitted. In still another alternative embodiment of the present invention, not shown, wherein the beam-steering system comprises two one-dimensional beam steering devices, both being transmissive devices, another fold back mirror is added. In still another alternative embodiment of the present invention, not shown, wherein the beam-steering system comprises two one-dimensional beam steering devices, both being transmissive devices, fold back mirror 14 is omitted.

Figure 14:
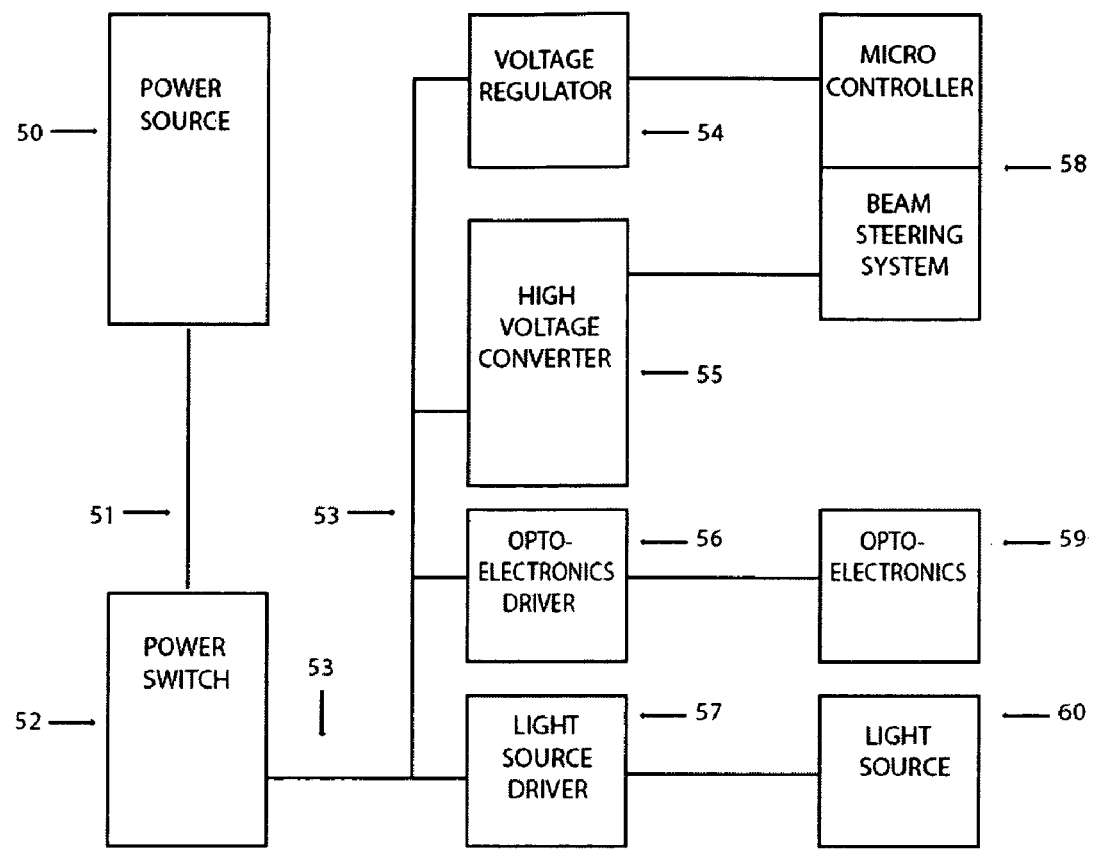
FIG. 14 is an electronics block diagram according to a preferred embodiment of the present invention.

FIG. 14 is an electronics block diagram applicable to a preferred embodiment of the present invention. Power from power source 50 is presented at power switch 52 through line 51. When power switch 52 is activated, power is delivered to the other components through lines 53. From line 53, power is delivered to voltage regulator 54 to decrease the voltages needed by microcontroller 58 of the beam-steering system. Power is also delivered by line 53 to high voltage converter 55, which converts a lower voltage to the large voltage need by the beam-steering device of beam-steering system 58. Power is also delivered by line 53 to optoelectronics driver 56, which provides a regulated drive signal to optoelectronics 59. Power is also delivered by line 53 to light source driver 57, which provides a regulated drive signal to light source 60. In an alternative embodiment of the present invention, not shown, power is also provided to a focusing-sensor device. In another alternative embodiment of the present invention, not shown, power is provided to an infrared-sensing device. In still another alternative embodiment of the present invention, not shown, power is provided to an ultraviolet device.

In further description of the preferred embodiments of the present invention, the device will draw a polygonal solid-light pattern onto a targeted area. Individually selected shapes may be "carved out" of the original polygonal-shaped light pattern to yield other light patterns such as, but not limited to, circles, rectangles, complex polygons, or a combination thereof. This may be accomplished by methods such as, but not limited to, an adjustment to the voltage and/or degree of the angle of light coming from the beam-steering system or a controlled pulsing of the light source to cause no light to be emitted at undesirable intervals or by optical shutter means or by a combination of thereof.

The present invention has been described with reference to certain preferred and alternative embodiments that are intended to be exemplary only and not limiting to the full scope of the present invention as set forth in the appended claims.

What is claimed is:

1. A scanning illumination system, comprising:
   (a) a housing;
   (b) a light source connected to said housing;
   (c) a MEMS beam-steering device connected to said housing and positioned in the path of light emitted by said light source;
   (d) a controller in communication with said beam-steering device wherein said controller is configured to manipulate the MEMS beam-steering device to produce a polygonal-shaped illumination pattern;
   (e) a power source operatively connected to said light source, said beam-steering device, and said controller; and
   (f) beam shaping optics positioned in the path of light emitted by said light source, wherein said beam shaping optics comprises a reflector and a set of plano-convex lenses.

2. The scanning illumination system of claim 1, wherein said beam-steering device comprises a two-dimensional micro-mirror.

3. The scanning illumination system of claim 1, wherein the beam-steering device comprises a plurality of one-dimensional micro-mirrors.

4. The scanning illumination system of claim 1, wherein said light source comprises a light emitting diode.

5. The scanning illumination system of claim 1, wherein the light source comprises a xenon light source.

6. The scanning illumination system of claim 1, wherein the light source comprises high intensity discharge light source.

7. The scanning illumination system of claim 1, wherein the light source comprises an infrared device.

8. The scanning illumination system of claim 1, wherein the light source comprises a coherent lighting source.

9. The scanning illumination system of claim 1, wherein the microcontroller is in communication with said light source.

10. The scanning illumination system of claim 1, further comprising a light-sensing device in communication with said controller.

11. The scanning illumination system of claim 1, wherein said controller is configured to manipulate the MEMS beam-steering device to produce a rectangular-shaped illumination pattern.

12. The scanning illumination system of claim 11, wherein said controller is configured to manipulate the MEMS beam-steering device to produce a square-shaped illumination pattern.

13. A scanning illumination system, comprising:
   (a) a housing;
   (b) an exterior lighting device in connection with said housing;
   (c) a MEMS beam-steering device connected to said housing and positioned to receive a spot-beam from said exterior lighting device;
   (d) a controller in communication with said beam-steering device;
   (e) a power source in communication with said beam-steering device, said lighting device, and said controller; and
   (f) beam shaping optics connected to said housing and positioned in the path of the spot-beam from said exterior lighting device wherein said beam shaping optics comprises a reflector and a set of plano-convex lenses.

14. A scanning illumination system having a square-shaped illumination pattern, comprising:
   (a) a housing;
   (b) a light source connected to said housing;
   (c) a MEMS beam-steering device connected to said housing and positioned in the path of light emitted by said light source;
   (d) a beam shaping optics system connected to said housing and positioned in the path of the light emitted by said light source wherein said beam shaping optics comprises a reflector and a set of plano-convex lenses;
   (e) a controller in communication with said beam-steering device for determining the square-shaped illumination pattern; and
   (f) a power source operatively connected to said light source, said beam-steering device, and said controller.

* * * * *